Dec. 6, 1949
F. C. KUSSE ET AL
2,490,361
VARIABLE THRUST ROTOR DRIVE FOR
ROTARY WING SUSTAINED AIRCRAFT
Filed Aug. 11, 1945
3 Sheets-Sheet 1
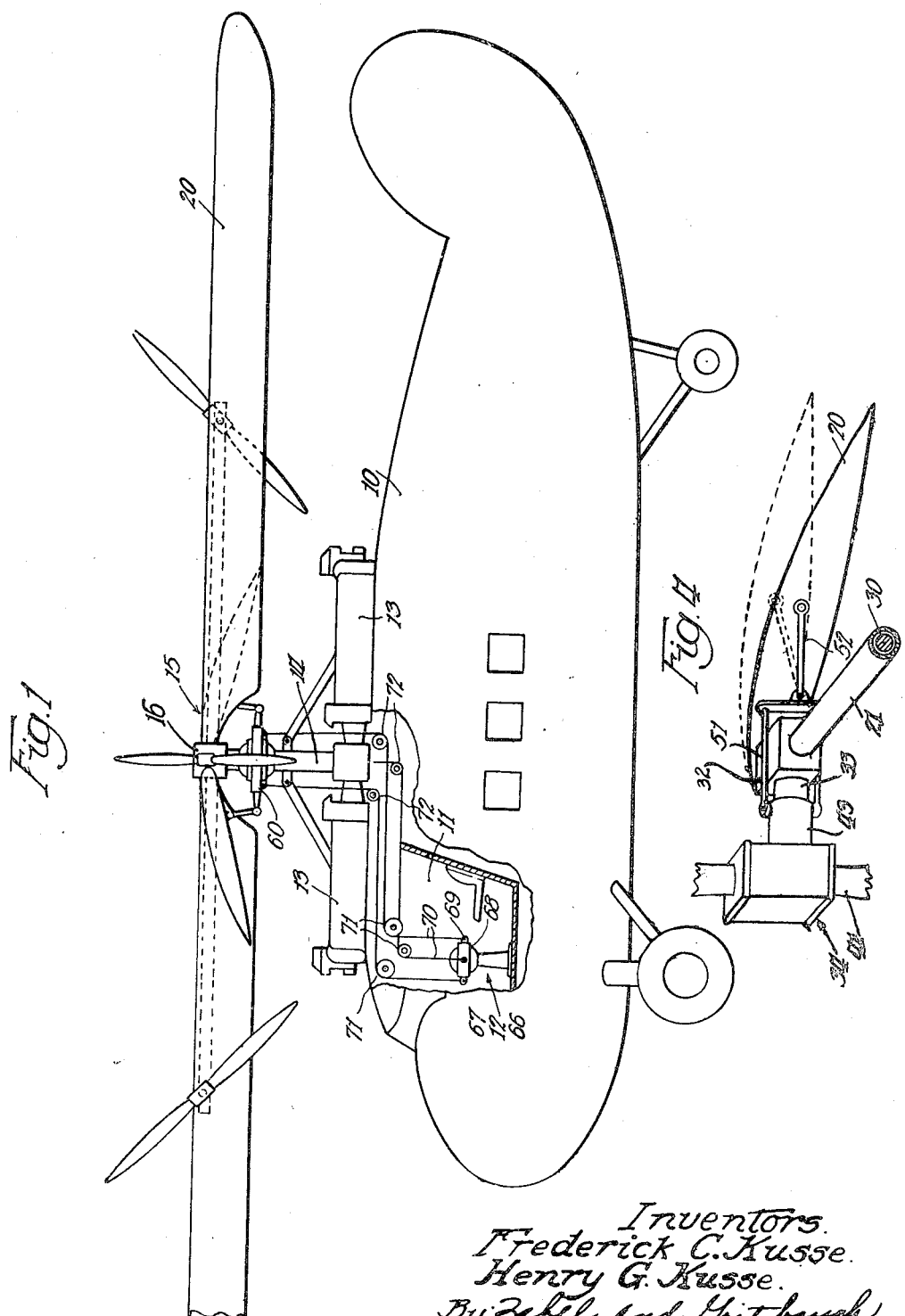
Inventors.
Frederick C. Kusse.
Henry G. Kusse.
By: Zabel and Fitzbaugh
Attys.

Dec. 6, 1949 — F. C. KUSSE ET AL — 2,490,361
VARIABLE THRUST ROTOR DRIVE FOR ROTARY WING SUSTAINED AIRCRAFT
Filed Aug. 11, 1945 — 3 Sheets-Sheet 2
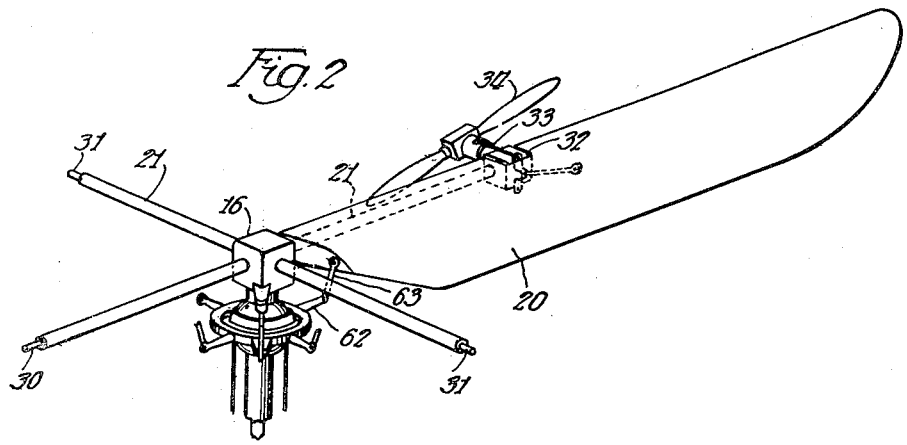
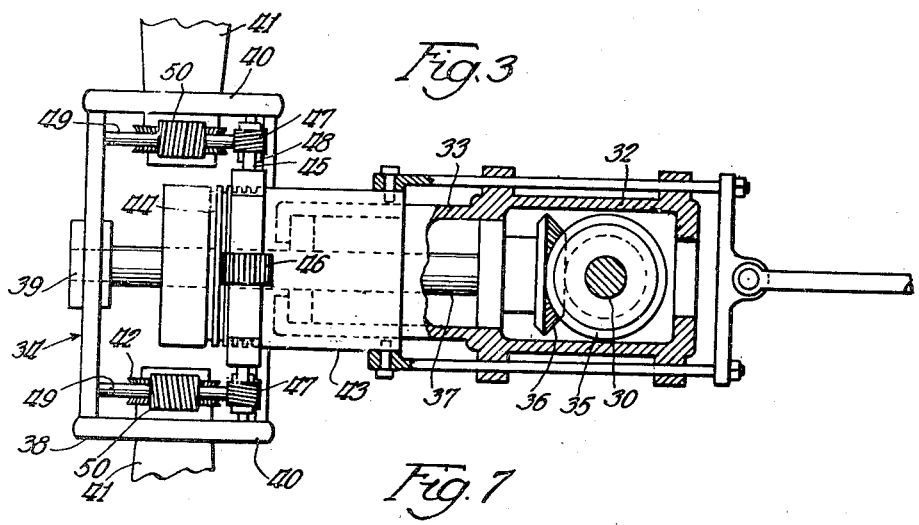
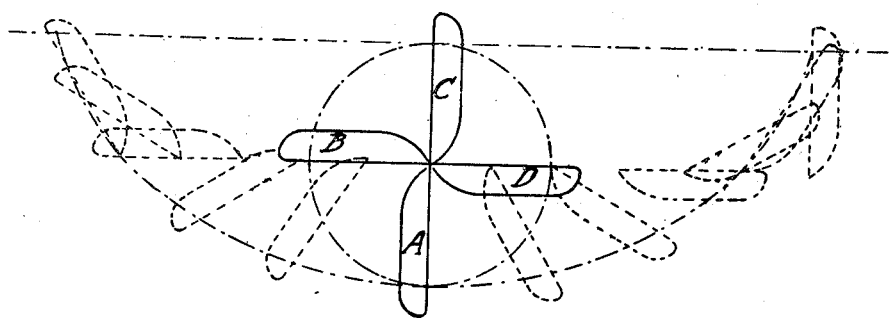
Inventors:
Frederick C. Kusse.
Henry G. Kusse.
By Zabel and Fitzhugh
Attys

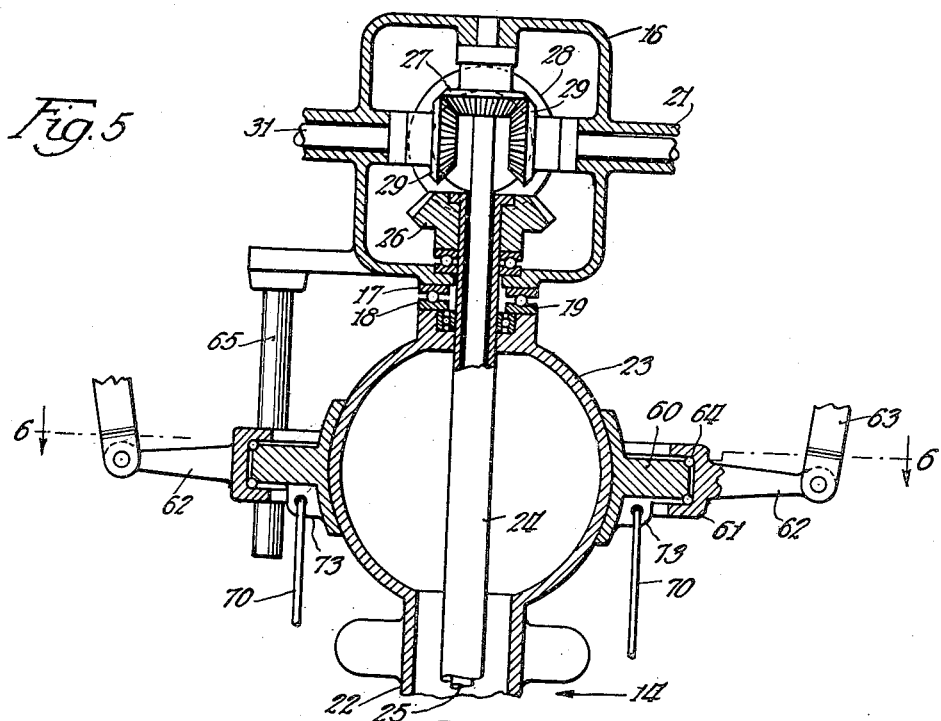
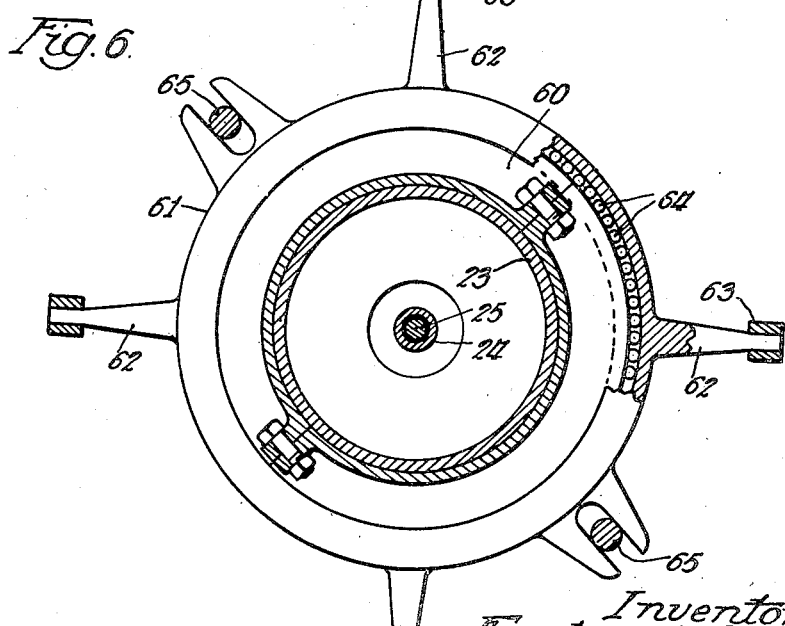

Patented Dec. 6, 1949

2,490,361

UNITED STATES PATENT OFFICE 2,490,361

VARIABLE THRUST ROTOR DRIVE FOR ROTARY WING SUSTAINED AIRCRAFT

Frederick C. Kusse and Henry G. Kusse, Chicago, Ill.

Application August 11, 1945, Serial No. 610,220

9 Claims. (Cl. 170—135.21)

1

The present invention relates to aircraft and more particularly to heavier than air machines wherein a lifting airscrew or rotor is employed as a means for obtaining the lift necessary to cause the aircraft to rise.

The invention has to do specifically with an aircraft of the type shown in Patent No. 1,924,192, granted August 29, 1933, to Frederick C. Kusse, wherein forward motion of the aircraft is produced by varying the angle of attack of the wings or blades of the airscrew or the angle of ailerons with respect to the wings. As is pointed out in this prior patent the problem involved is to obtain horizontal flight of an aircraft of this type by novel means without the use of any additional propelling means over and above those necessary to rotate the airscrew. The present invention constitutes an improvement over the arrangement shown in the prior patent.

It is an object of the present invention to increase the efficiency of the propelling means for an aircraft of the helicopter type. The lift during flight of the aircraft is accomplished by utilizing the forward speed of the wings on the airscrew in conjunction with the rotative speed of the rotor. In this manner forward flight of the aircraft can be accomplished with a relatively slower rate of rotation of the airscrew than is otherwise possible.

The aircraft forming the subject matter of the present invention employs propellers mounted on the wings of the airscrew for effecting the rotation of the airscrew. The increased efficiency that is produced by virtue of the present invention is accomplished through the provision of a novel relationship between the propeller blades and the tilt or pitch of the wings of the windmill or of the ailerons as the case may be.

The foregoing constitute some of the principal objects and advantages of the present invention, others of which will become apparent from the following description and the drawings; in which Fig. 1 is a side elevational view of a helicopter employing the present invention;

Fig. 2 is a fragmentary perspective view of the windmill or rotary portion of the helicopter;

Fig. 3 is an enlarged, more or less diagrammatic, detailed view shown partly in elevation, and partly in section, and illustrating the mechanism for changing the pitch of the propeller blades;

Fig. 4 is a fragmentary perspective view diagrammatically illustrating the relationship between the blade pitch regulating device and the corresponding rotor wing;

Fig. 5 is an enlarged detail sectional view, shown more or less diagrammatically of the driving connection between the vertical shafts from the motors and the shafts driving the propellers on the airscrew wings;

Fig. 6 is a transverse sectional view shown partly in elevation and taken on the line 6—6 of Fig. 5; and Fig. 7 is a diagram illustrating certain relative wing positions during flight.

The aircraft forming the subject matter of the present invention will be referred to hereinafter as a helicopter. This machine consists essentially of the conventional fuselage, landing gear, and tail surfaces of an airplane, but in place of wings that are more or less stationary with respect to the fuselage, it is equipped with a large airscrew or rotor caused to rotate by means of propellers mounted on the wings of the airscrew and adapted to rotate about a horizontal axis. These propellers are driven through gearing from shafts extending from a power unit which in the present instance comprises two engines mounted on the fuselage of the aircraft.

Briefly described horizontal flight with this type of aircraft is obtained by virtue of a variation of pitch of the propellers as they make their circuit about the rotor hub. By varying the pitch of the propeller blades in accordance with a predetermined relationship to the angle of attack of the airscrew wings or blades, the efficiency of the aircraft, insofar as concerns its forward motion, is enhanced.

Referring to Fig. 1 of the drawings, the fuselage of the aircraft is shown at 10. The pilot's cab illustrated at 11 is provided with suitable operating mechanism generally indicated at 12.

Mounted on top of the fuselage 10 are a pair of engines 13 and extending above these engines and supported on the fuselage 10 is a pedestal 14 adapted to support the airscrew or rotor generally indicated at 15. The engines 13 as shown are disposed 180° apart.

Referring to Figs. 1, 2 and 5, the rotor 15 comprises a central gear housing 16 that is provided at its lower end with a bearing portion 17 adapted to cooperate with a bearing portion 18 disposed at the upper end of the pedestal 14. These cooperating bearing portions 17 and 18 may be provided with ball bearings or the like 19 so that the gear housing 16 may rotate about a vertical axis on the pedestal 14.

Radiating outwardly from the gear housing 16 are four wings 20, only one of which is illustrated in Fig. 2. These wings are disposed 90° apart and are mounted on tube like members or shafts 21 so that each wing may pivot about its respective tube like portion 21.

The pedestal 14 comprises essentially a vertical hollow portion 22 (Fig. 5) having adjacent to the top thereof a spherical portion 23 that is also hollow. Extending upwardly from the engines 13 and through the hollow pedestal portions 22 and 23 are concentric shafts 24 and 25, both of which are geared to the engines 13 and project into the gear casing 16 disposed at the top of the pedestal 14. These shafts 24 and 25 are provided respectively with bevelled gears 26 and 27 which mesh with gears 28 and 29 respectively. There are two gears 28, one of which is shown in Fig. 5 and they are mounted at the adjacent ends of the pedestal disposed shafts 30 which are mounted inside corresponding hollow shafts 21 passing through wings 20. The gears 29 are disposed at the adjacent ends of the remaining two pedestal disposed shafts 31 (Fig. 5) and these shafts 31 in turn are rotatably mounted in the remaining two hollow shafts 21. Thus upon rotation of shafts 24 and 25 that are geared to the engines 13, rotary motion is conveyed to the shafts 30 and 31 that are disposed in the hollow shafts 21 in the wings 20.

At the free end of each of the hollow shafts 21 is a gear box 32 (Figs. 2 and 4). Extending forwardly from each of the gear boxes 32 is a hollow boss 33, carrying at the free end thereof a propeller generally indicated at 34. The shaft 30 or 31, as the case may be, enters the gear housing 32 and carries on the free end thereof a bevelled gear 35, adapted to mesh with a second bevelled gear 36 that is mounted on the end of a propeller shaft 37. This propeller shaft 37 extends through the hollow boss 33 and is journalled therein and projects therebeyond of the boss 33 so as to carry on its free end thereof the propeller 34.

As shown in Fig. 3, each propeller 34 may comprise a central box like portion 38 suitably secured as at 39 to the end of the propeller shaft 37. The box like portion 38 is provided with a pair of spaced wall portions 40 through each of which passes a propeller blade shown more or less diagrammatically at 41 in Fig. 3. This blade is adapted to rotate in the wall 40 about an axis disposed at right angles to the wall. On the inner end of each blade 41 is a blade gear 42.

Concentrically surrounding the bosses 33 that project forwardly from each gear housing 32 is a non-rotatable worm or rack member 43 that can slide axially with respect to the bosses 33 and projects into the box like portion 38 of the propeller 34. This non-rotatable worm or rack member 43 is provided with worm teeth 44.

Journalled in the end walls 40 of the box like portion 38 is a shaft 45 that is disposed at right angles to the shaft 37 and closely adjacent to the periphery of the non-rotatable worm 43. A pinion 46 is mounted on the shaft 45 directly adjacent directly adjacent to the periphery of the worm 43 with its teeth meshing with the teeth 44 of the worm 43. At opposite ends of the shaft 45 are disposed worm gears 47 adapted to mesh with an intermediate gear 48. Each of the latter gears is mounted on a shaft 49 that is disposed at right angles to the shaft 45 and is journalled in the box like portion 38. Centrally disposed on each of the shafts 49 is a blade worm 50 adapted to mesh with the corresponding blade gear 42 mounted on the inner end of the propeller blade 41.

Axial movement of the non-rotatable worm 43 with respect to the boss 33 causes rotation of the pinions 46, and thus the shaft 45 and worm gears 47. Thus rotation of the worm gears 47 causes rotation of the intermediate gears 48 and hence the shafts 49 with their blade worms 50. The change in pitch of the propeller blades 41 results from this rotation of the blade worms 50 that are meshed with the blade gears 42.

As shown the plane of rotation of the propellers preferably includes the axis of rotation of the airscrew 15.

Referring to Fig. 4 each of the wings 20 of the airscrew is adapted to pivot between the solid line position and the broken line position in a manner to be described hereinafter. Each non-rotatable worm 43 is operatively connected to its corresponding wing 20 by means of a connecting frame portion 51 and intermediate link 52. The link 52 is pivotally secured to a wing 20 as illustrated in Fig. 4, and as the wing moves between its two positions the pivot point for the link 52 likewise thus changes the effective length of the link 52 with respect to the frame 51 resulting in a reciprocating or axially movement of the non-rotatable worm 43 on the boss 33. Thus the change of pitch of propeller blades 41 is effective simultaneously with the movement of the corresponding rotor blade 20.

As previously mentioned, either the entire blade 20 may be tilted as is disclosed in this application, or the blade may be provided with an aileron that can be tilted in the manner illustrated in the previous Patent No. 1,924,192 mentioned hereinbefore. In this previous patent the tilting of the aileron is accomplished hydraulically. Herein the tilting of the wings of the rotor is illustrated as being accomplished by a manual control through suitable cables. In any event, whether each wing is a unit or a portion of each wing of the screw tilts, this is done cyclically. Variations in the angularity of the wing or wing portion result in variations in the effectiveness of the wing during rotation about the rotary axis. Thus for the sake of convenience the screw or rotor is described as having variable lift wings.

Referring for example to Figs. 1, 2, 5 and 6, a control disc 60 is mounted concentrically about the spherical portion 23 of the pedestal. This spherical portion 23 is at all times stationary while the control disc 60 is adapted to move in ball and socket fashion about the periphery of the spherical portion 23. The provision of tilting wings or wing portions per se, forms no part of the present invention, and therefore a more or less diagrammatic showing is made herein and only a sufficient description of the mechanism for controlling the tilt of the wings will be made herein to permit the invention to be understood.

The control disc 60 supports a concentric ring portion 61 that is provided with radial arms 62. A link 63 connects the free end of each arm 62 with one of the wings 20 at such a distance from the wing axis as to assure the angular movement of the wing through the predetermined range of angle settings best shown in Fig. 2. The concentric ring 61 is adapted to rotate about the control disc 60, the latter disc being non-rotatable about the spherical portion 23 of the pedestal. Ball bearings 64 may be provided between the concentric ring 61 and the control disc 60. A driving arm 65 may extend downwardly from the gear housing 16 to impart rotary motion of the concentric ring 61 and the associated wings 20 making up the airscrew 15.

The operating mechanism 12 located in the pilot's cab (as diagrammatically illustrated in Fig. 1) comprises a pedestal 66 provided at the top thereof with a stationary spherical portion 67. Concentrically mounted about this stationary spherical portion 67 is a control disc 68 that is adapted to move about the spherical surface 67 in all directions so as to effect a ball and socket type of action. The control disc 68 is provided with four radially extending ears 69 to each of which is connected a cable 70. The cables 70 are thus disposed 90° apart with respect to the control disc 68 and through suitable sets of guide wheels 71 and 72. These cables extend from the control disc 68 to the first mentioned control disc 60 located at the top of the pedestal 14 extending above the fuselage 10. These cables 70 are secured 90° apart to the control disc 60 in positions corresponding to the positions on the control disc 68 located in the pilot's cab 11. Two of these cables 70 are shown in Fig. 5 and as illustrated they are fastened to ears 73 on the control disc 60.

It is thus apparent that the control disc 60 is at all times maintained parallel with the control 68 so that whatever position is assumed by the control disc 68 in response to the manipulation by the pilot a corresponding position is assumed by the control disc 60. Since the control disc 60 is operatively connected to the wings 20 as previously described, the initial tilt of the wings 20 is established by the position of control disc 68. Likewise since the pitch of the propeller blades 41 is determined by the tilt of the corresponding rotor wing 20, initial setting of the control disc 68 in the pilot's cab likewise determines the initial relationship between the pitch of blades 41 and the tilt of the corresponding rotor wing 20.

The operation of the controls and the relationship with the tilting wings on the airscrew is completely described in the aforesaid prior patent. As previously mentioned the prior patent discloses hydraulic means for controlling the tilt of the wings whereas herein a mechanical device is illustrated. The result of tilting the wings however, on the operation of the aircraft is completely described in the aforesaid prior patent and since this operation per se forms no part of the present invention, it is believed unnecessary herein to again give a complete explanation of the operation.

Reference is hereby made to the previously mentioned prior patent for a more complete description of this operation.

When the aircraft has been raised vertically from the ground and is hovering at the desired altitude horizontal movement in a forward direction may be obtained by manipulating the control disc 68 from this horizontal position downwardly on the side where the wings 20 are receding relative to the fuselage of the aircraft and upwardly on the opposite side of the spherical portion 67 of the controls. This displacement of the control disc 68 from its former horizontal position causes variations of the angle settings of the wings 20 and of the pitch settings of the propellers 41 during the rotation of the airscrew about the vertical pedestal 14. Since the mechanism for varying the pitch of the propeller blades 41 is actuated by levers which follow the sine variation corresponding to that of the wings 20 and since these levers are connected 90° apart on the control disc 60 the amplitude of the sine variation of the four propellers will at all times vary in phase by 90°.

The relationship between the propeller blades and the tilt of the wings 20 forms part of the present invention because it is this relationship that increases the efficiency of the operation of the helicopter over and above that obtained in aircrafts of the types disclosed in the previously mentioned patent. In Fig. 1 the cab control mechanism 12 is shown in neutral position wherein the control disc 68 is disposed horizontally. In this position of the control disc the tilt of all wings 20 is the same and remains constant during rotation of the airscrew and the propeller blades 41 are all in their neutral position and remain in this position during rotation of the airscrew. This neutral position is maintained during the time the helicopter is raised vertically off the ground and during hovering. When the aircraft is in the air the control disc 68 is manipulated to a position corresponding to the requirements of the pilot so as to effect cyclical variation of the angle settings of the wings 20 during the rotation of the airscrew. As a result of this cyclical variation of the angle of the wings the pitch of propeller blades 41 will be changed correspondingly and motion of the helicopter will take place corresponding to this initial setting of the control disc 68. This motion will be in a forwardly direction if the pilot so manipulates the control disc 68. The paths of the individual wings in forward flight are cycloidal. At the cusps of the cycloids the angle settings of the wings and the propeller pitch setting corresponds with those for take-off of a conventional airplane. While at 180° from this positon the advancing wing of the airscrew and the blades of the corresponding propeller assume the positions corresponding to low angle of attack and very high pitch respectively. Thus with this combination of variable pitch propellers used in conjunction with variable lift wings of the type herein described, less tilting of the rotor axis takes place during flight of the aircraft in a forwardly direction than in the case where the variable lift wings are used alone. Further, increased efficiency results from the fact that the propeller pitch is varied in a manner permitting them to operate at the best value of $$\frac{V}{nD}$$

corresponding to each point in their path.

Although a good workable helicopter can be produced utilizing the principle of the lifting airscrew having cyclical variations of the position of the wings or blades as disclosed in the previously mentioned patent, nevertheless an even more efficient aircraft is produced by the combination herein described in which not only the wings but also the propeller pitch is varied in unison with the rotation of the rotor.

Where only the helicopter blades or wings are varied cyclically there results an induced tilt of the lifting airscrew which can be controlled to produce forward motion or motion in any desired direction. That is, forward motion is the effect of a horizontal component of the total force produced by the lifting airscrew.

Where not only the wings but also propeller pitch are caused to vary in accordance with the period of rotation of the rotor as herein described, forward motion results from the difference in pitch of the propellers. On the side of the rotor where the wings are advancing the propellers take a bigger bite into the air than on the opposite side and lateral or forward movement of the helicopter takes place. The greater the differential of pitch of the propellers the greater the forward motion. Thus, by this arrangement the impulse for forward motion is direct from the propellers as is the case in the conventional airplane. The result of the difference in pitch of the propellers is that instead of a tilted rotor we have a rolling rotor; that is, while the rotor remains in a horizontal plane and the greater impulses from the propellers always occur on the same side of the aircraft the effect is the same as if it were rolling on a straight line, the size of the theoretical rolling circle depending upon the amount of variation of pitch of the propellers in rotation about the rotor hub.

The neutral angle settings of the wings are so chosen that when the wings of the helicopter are following cycloidal paths as in Fig. 7, wing A is operating at zero lift while wing C, which would be at a cusp of its path, is operating at zero speed and high angle of attack. Hence wing A and C under conditions of Fig. 7 produce no lift. But it can be shown mathematically that without increasing the speed of rotation substantially beyond that necessary for hovering, wings B and D would each produce twice the lift of a single wing at hovering. By making computations for the instantaneous values of lifts of the wings in their various positions in their cycloidal paths shown in Fig. 7, it can be shown that without increasing the speed of rotation of the rotor a balanced effect of lift is produced at all times. As the helicopter assumes various speeds starting from the hovering position we can show that the wings in the fore and aft positions as B and D carry more and more of the weight, while wings in lateral positions A and C carry less and less of the weight, but the sum total of the lift of the four wings will be the same as that for hovering.

Referring to Fig. 7 the propeller of wing A would be at high pitch position while the propeller of wing C would be in low pitch position. The propellers at B and D would be at neutral propeller pitch setting.

Where the theoretical rolling circle is greater than that shown in Fig. 7 the cusps of the cycloidal paths smooth out to become curves in the opposite direction. This would be the case where the forward speed is relatively great, and there would be a large differential of pitch of the propellers. In such helicopters designed for high forward speed the use of reversible pitch propellers would be an advantage. The negative lift of the lateral wings would be made up by a corresponding excess of lift by the fore and aft wings.

From the foregoing description it can be seen that a new general principle of producing forward flight of a helicopter is illustrated. Briefly, the principle is embodied in a rotor having wings or blades, the lift of which can be varied cyclically, in combination with propulsion means, such as propellers, the propulsion characteristics of which can be varied cyclically with the period of rotation of the rotor.

The drawings show the wings tiltable on substantially horizontal longitudinal axes. The shaft arms 21 form the pivotal axes of the wings, thus permitting feathering of the wings in forward flight. However, any other cyclical variation of the wing or part thereof, such as a cyclical movement of a wing flap or aileron, would cause similar results. The invention consists primarily in combining such a rotor having variable lift characteristics provided, for example, by the variable lift wings with propulsion means for rotating said rotor, said propulsion means permitting variations cyclically with the rotation of the rotor. In the embodiment of the invention shown herein the cyclical variations in the propulsion means are provided by varying the pitch of the blades on the propeller. By providing the proper relationship between the varying propulsion means and the varying lift characteristics of the wings a helicopter will have balanced horizontal flight conditions without requiring the rotor axes to be tilted.

One embodiment only of the present invention has been described for purposes of illustration. It is recognized that many changes may be made as for example, the actual setting of the relationship between the tiltable wings and the pitch of the propeller blades may be selected in a manner other than that disclosed. In the embodiment of the invention illustrated this relationship is effected by manipulation of a single control element. The regulation of the pitch of the propeller blades can be accomplished separately from that of the wings by any other suitable means.

It can also be accomplished by means other than the worm and gear arrangement illustrated; as for example it may be regulated by other mechanical means, or electrically or hydraulically.

It is also recognized that the variable pitch blades on the propeller may be automatic, i. e., they may be varied by the changes in air pressures.

Many other modifications may be made in the specific embodiment disclosed herein without departing from the intended spirit and scope of the invention.

Having thus described our invention, we claim:

1. In a rotary wing sustained aircraft, lifting blades, means mounting said lifting blades for rotation about an upright axis and control means for varying the lift of said blades including control connections to each blade, thrust producing means to rotate said blades including a power source, variable pitch propellers rotatably mounted on said blades and drivingly connected to said power source, a control mechanism operatively interconnecting the pitch varying means of said propellers, and means for operatively interconnecting said control means with said control mechanism.

2. In a rotary wing sustained aircraft having a fuselage, lifting blades, means mounting said lifting blades for rotation about an upright axis supported on the fuselage, a tiltable lift control unit universally mounted about a point on the upright axis, means operatively connecting the control unit to the blades, means for tilting said control unit comprising a master unit universally mounted about a fixed point in the fuselage of said aircraft and means operatively connecting said master unit to said control unit whereby tilting of the master unit causes corresponding tilting of the lift control unit, thrust producing means to rotate said lifting blades including a power source, propellers on the blades drivingly connected to the power source, rotatable mounting means for the propeller blades, means movably mounting each blade in the rotatable mounting means so that each blade is movable in a pitch changing direction, and means operatively connecting the movable mounting means with the tiltable lift control unit for changing the pitch of the propeller blades in response to the operation of the tiltable lift control unit, the last mentioned connecting means being synchronized with the means connecting the control unit with the blades so that the blade pitch varies in synchronism with the variations in the lift of the lifting blades.

3. In a rotary wing sustained aircraft having a fuselage, lifting blades, means mounting said lifting blades for rotation about an upright axis supported on the fuselage, a tiltable lift control unit universally mounted about a point on the upright axis, means operatively connecting the control unit to the blades, means for tilting said control unit comprising a master unit universally mounted about a fixed point in the fuselage of said aircraft and means operatively connecting said master unit to said control unit whereby tilting of the master unit causes corresponding tilting of the lift control unit, thrust producing means to rotate said blades including a power source, propellers on the blades drivingly connected to the power source and adapted to rotate the lifting blades and comprising rotatable mounting means for the propeller blades, means movably mounting each propeller blade in the rotatable mounting means so that each blade is movable in a pitch changing direction, and means controllable by the master unit and operatively connecting the movable mounting means with the tiltable lift control unit for changing the pitch of the propeller blades in response to the operation of the master unit, the last mentioned connecting means being synchronized with the means connecting the control unit with the propeller blades so that the blade pitch varies in synchronism with the variations in the lift of the lifting blades.

4. A vertically rising aircraft having an airscrew provided with movable wings having adjustable lift characteristics, an upstanding pedestal on said aircraft upon which said airscrew is mounted, said pedestal having an exterior spherical guide surface, a control device for changing the lift of said wings mounted on said pedestal and including a control ring guided by said surface, means interconnecting said airscrew and control ring to cause them to rotate together, means for changing the angular setting of said ring on said guide surface while the ring is rotating, means operatively connecting the ring to the wings so that angular movement of the ring is imparted to the wings to change the lift of the wings, thrust producing means to rotate the airscrew including a power source, a propeller on each wing, rotatable mounting means for each propeller drivingly connected to the power source, means movably mounting each propeller blade in the rotatable mounting means so that each propeller blade is movable in a pitch changing direction, and means operatively connecting each propeller blade to the wing so that the pitch of the blades can be changed in response to variations in the lift of the wings.

5. The combination in aircraft of a fuselage, lifting blades, means mounting the lifting blades for rotation about an upright axis on the fuselage, thrust producing means to rotate the lifting blades including a power source, propellers on the lifting blades drivingly connected to the power source, means mounting the propellers for rotation, means mounting the lifting blades for movement to vary their lift characteristics, means mounting the propeller blades in the propeller mounting means for movement in a pitch varying direction, a cyclic control unit on the fuselage operatively connected to the lifting blades and to the propeller blades so as to vary the pitch of the propeller blades and the lift of the lifting blades cyclically as the lifting blades rotate about the upright axis.

6. In a rotary wing sustained aircraft, a fuselage, a vertically disposed housing supported on and extending upwardly above the fuselage, lifting blades, means mounting the lifting blades adjacent to the upper end of the housing for rotation about its upright axis, thrust producing means to rotate said blades including a power source in the fuselage, a drive shaft in the housing drivingly connected at one end to the power source and extending to the upper end of the housing, variable pitched propellers rotatably mounted on the lifting blades, a rotatable stub shaft supporting each blade, means drivingly connecting the upper end of the first mentioned shaft to the stub shaft, a control mechanism operatively connected to the propeller blades to vary the pitch of the blades including a universally tiltable control unit situated on the vertical axis of the housing below the lifting blades, said universal control unit including a control member mounted to rotate about the axis of the housing, means interconnecting said control member and the lifting blades to cause the control member to rotate with the lifting blades, means for changing the angular position of the control member with respect to the vertical axis of the housing while the control member is rotating, the change in angular position of the control member being imparted to the lifting blades so as to produce a like change in the angle of the lifting blades so as to vary the lift characteristics of said blades, and means operatively connecting the propeller blades with the lifting blades so that changes in the angle of the lifting blades effect simultaneous changes in the pitch of the propellers.

7. In a rotary wing sustained aircraft, lifting blades, means mounting said lifting blades for rotation about an upright axis, control means for varying the lift of said blades including control connections to each blade, thrust producing means to rotate said blades including a power source, variable pitch propellers rotatably mounted on said blades and drivingly connected to said power source, the propellers being so disposed relative to the lifting blades that the plane of rotation of each of the propellers includes the upright axis, a control mechanism operatively connected to the propeller blades to vary the pitch of the blades, and means operatively interconnecting said control means with said control mechanism so that changes in the lift characteristics of the lifting blades is effected simultaneously with changes in the pitch of the propeller blades.

8. In a rotary wing sustained aircraft, lifting blades, means mounting said lifting blades for rotation about an upright axis, thrust producing means on said blades to rotate the lifting blades, means for reversing the direction of thrust of said thrust producing means during blade rotation, and control means operatively connected to the reversing means for producing a counter rotative force during blade rotation on the side where the blades are retreating with respect to forward flight of the aircraft.

9. In a rotary wing sustained aircraft, lifting blades, means mounting said lifting blades for rotation about an upright axis, means for varying the lift of said blades including control connections to each blade, thrust producing means on said blades to rotate the lifting blades, means for reversing the direction of thrust of said thrust producing means during blade rotation, and control means operatively connected to the reversing means for producing a counter rotative force during blade rotation on the side where the blades are retreating with respect to forward flight of the aircraft.

FREDERICK C. KUSSE.
HENRY G. KUSSE.

REFERENCES CITED

The following references are of record in the file of this patent:

UNITED STATES PATENTS

| Number | Name | Date |
|---|---|---|
| 1,419,363 | Earle | June 13, 1922 |
| 1,519,866 | Marchetti | Dec. 16, 1924 |
| 1,924,192 | Kusse | Aug. 29, 1933 |
| 1,934,399 | Bleecker | Nov. 7, 1933 |
| 1,982,968 | Stalker | Dec. 4, 1934 |
| 1,982,969 | Stalker | Dec. 4, 1934 |
| 2,074,342 | Platt | Mar. 23, 1937 |
| 2,254,963 | Hovland | Sept. 2, 1941 |
| 2,272,664 | Gropler | Feb. 10, 1942 |